June 4, 1963     B. F. HAIR     3,092,399
FIFTH WHEEL CONTROL DEVICE
Filed Dec. 4, 1961     2 Sheets-Sheet 1

INVENTOR.
BENJAMIN F. HAIR
BY John R. Faulkner
Clifford L. Sadler
ATTORNEYS

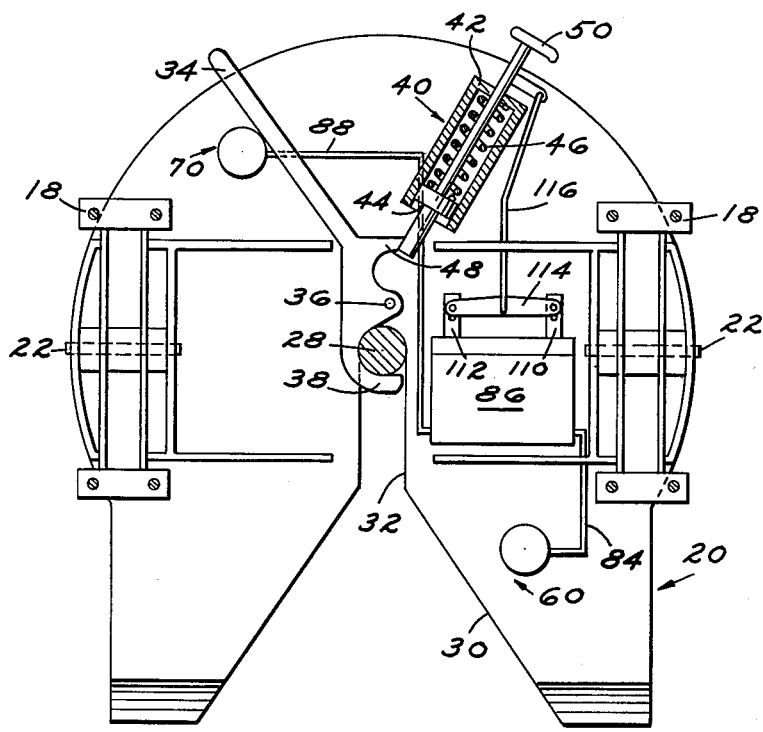

United States Patent Office 3,092,399
Patented June 4, 1963

3,092,399
FIFTH WHEEL CONTROL DEVICE
Benjamin F. Hair, Dearborn, Mich., assignor to Ford
Motor Company, Dearborn, Mich., a corporation of
Delaware
Filed Dec. 4, 1961, Ser. No. 156,888
4 Claims. (Cl. 280—438)

The present invention relates generally to constructions employed to connect a semi-trailer with a truck tractor and more particularly to hydraulic means for controlling movement of the fifth wheel employed at such coupling.

The conventional truck tractor has a relatively short wheelbase and high center of gravity resulting in a high pitch frequency. The principal object of the present invention is to use the high amount of inertia of the semi-trailer in reducing the pitch frequency of the towing vehicle.

In accordance with the preferred embodiment of the present invention, the fifth wheel horizontal pivot is locked by fore and aft hydraulic cylinders that force the tractor-trailer to move as a unit. The hydraulic cylinders are connected to a common unloading valve so that when loading exceeds a predetermined amount, the system is open and the fifth wheel is free to pivot in a conventional fashion. With this construction the tractor and trailer will be locked together for low load, low amplitude disturbances but will be unlocked for high load and high amplitude disturbances that might otherwise cause excessive forces on the tractor or trailer structure.

The unloading valve is provided with a connection to the kingpin latch. When the kingpin is unlatched the hydraulic system is unloaded and the fifth wheel can pivot freely for coupling purposes.

The objects and advantages of the present invention will become amply apparent from the following description and the accompanying drawings, in which.

Figure 1:
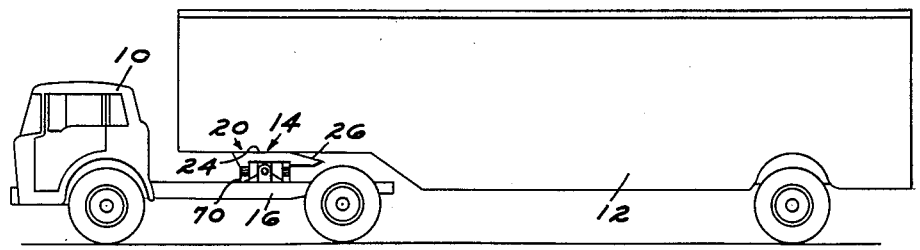
FIGURE 1 is a side elevational view of a tractor-trailer combination incorporating an embodiment of the present invention at the coupling between said units.
Figure 2:
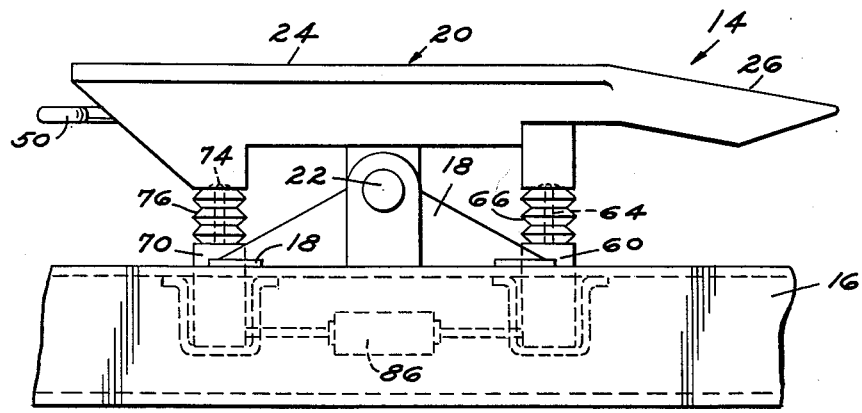
FIGURE 2 is a side elevational view disclosing the coupling construction in FIGURE 1.
Figure 3:
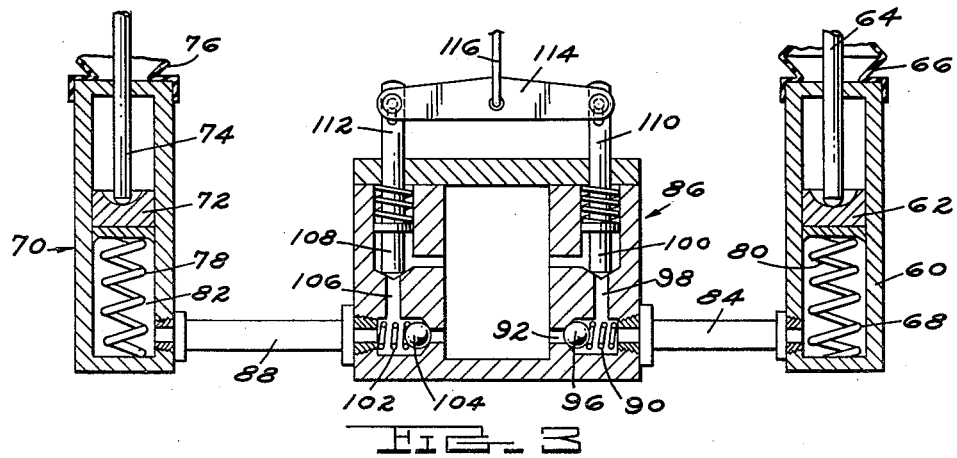
FIGURE 3 is a schematic representation of a hydraulic control mechanism for the coupling construction of FIGURE 3; and, FIGURE 4 is a bottom plan view of the construction shown in FIGURE 2.

Referring now to the drawings, FIGURE 1 discloses a truck tractor 10 and a trailer unit 12 that are connected by a coupling 14 constructed in accordance with the present invention. FIGURE 2 shows in side elevation the structure of the coupling 14.

The tractor 10 has a pair of chassis frame side rails 16 to which brackets 18 are welded. The brackets 18 constitute a pivot support for a fifth wheel 20. The fifth wheel 20 is pivotally connected to the brackets 18 by pivot shafts 22.

The pivotally mounted fifth wheel 20 has a flat horizontal face 24 and an inclined ramp 26 leading up to the face 24. This construction is adapted to be driven under the forward part of the trailer 12 which has a bearing surface that is designed to rest upon the face 24.

The trailer 12 is provided with a vertically depending kingpin 28 that is engaged by the fifth wheel construction. Referring to FIGURE 4, the ramp portion 26 has a diverging opening 30 that connects with a central slot portion 32 provided in the face 24. The ramp 26 and V-shaped opening 30 are adapted to guide the kingpin 28 into the slot 32 when the tractor 10 is backed under the trailer 12 and the kingpin 28 comes to rest against the inner end of the slot 32.

The kingpin 28 is held in place by a latch lever 34 that is pivotally connected at 36 to the fifth wheel 20. The latch 34 has a finger portion 38 that is adapted to encircle the kingpin 28 and retain it in position. The latch lever 34 is retained in a closed position by a spring-operated lock assembly 40. The lock assembly includes a cylinder 42 secured to the fifth wheel 20 that contains a slidably disposed plunger mechanism 44 which is urged outwardly by a coil spring 46. The end of the plunger 44 engages a protruding portion 48 extending from the lever 34 to lock it in a closed position. When the handle end 50 of the plunger 44 is pulled outwardly against the force of the spring 46, latch lever 34 is free to be pivoted to disengage the kingpin 28.

A conventional fifth wheel coupling provides an articulated connection between a tractor and a trailer so that the combination vehicle may be operated over irregular roads without imposing undue stresses at the connection. However, due to the relatively short wheel base of the tractor pitching is often a problem. This invention proposes an improvement to reduce the pitch frequency by controlling the pivotal movement of the fifth wheel.

A hydraulic cylinder 60 is secured to the chassis of the vehicle at a point rearwardly of the fifth wheel pivot 22. A piston 62 is slidably disposed within the cylinder 60 and has a piston rod 64 connected to the fifth wheel 20. A coil spring 68 is interposed between the piston 62 and the depth of the cylinder 60. A booth type seal 66 protects the hydraulic mechanism from contamination.

A second cylinder 70 is connected to the chassis forwardly of the pivot 22. Cylinder 70 contains a piston 72, a piston rod 74 and a dust seal 76 of a similar construction to the hydraulic cylinder 60. Piston rod 70 is joined to the fifth wheel member 20 at a point forwardly of the pivot 22. A coil spring 78 is disposed within the cylinder and urges the piston 72 upwardly.

The rear cylinder assembly 60 defines a hydraulic chamber 80 situated beneath the piston 62. Similarly, a hydraulic chamber 82 is located beneath the piston 72 of the forward hydraulic cylinder 70. The rear chamber 80 is in communication with a conduit 84 that is connected to an unloading valve assembly 86. Similarly, chamber 82 of the forward cylinder assembly 70 has a conduit 88 joining it with the unloading valve 86.

The unloading valve 86 is provided with a rear inlet passage 90 to which the conduit 84 is connected. Passage 90 has a first branch 92 that is connected to a central reservoir chamber 94. A ball type one-way check valve element 96 is spring pressed to seal the branch passageway 92 against fluid flow from inlet 90 toward reservoir 94. A second branch passageway 98 extends from the inlet 90 and is in communication with the reservoir 94. Passageway 98 contains a spring-pressed relief valve 100.

When the piston 62 is pushed downwardly by tilting motion of the fifth wheel 20, fluid will be forced from the chamber 80 into the inlet 90 of the valve assembly 86. The check valve 96 will be closed and prevent the passage of fluid directly into the reservoir 92. Spring-pressed relief valve 100 is also closed, however, if the fluid pressure is sufficient the spring and valve assembly will recede to permit fluid to flow through passageway 98 to the reservoir 94.

The valve assembly 86 is symmetrical in that the forward hydraulic cylinder assembly 70 and its chamber 82 are connected to an inlet 102 that is sealed from the reservoir by a check valve 104. An alternate passageway 106 to the reservoir chamber 94 is sealed by a spring-pressed relief valve assembly 108. When the piston 72 is forced downwardly by motion of the fifth wheel 20, fluid will be expelled from the chamber 82 and enter the inlet 102 of the valve assembly 86. The fluid will be unable to pass the check valve 104 and will enter passageway 106. If the fluid pressure is sufficient, the spring of the valve assembly 108 will recede and permit the fluid to enter the reservoir 94.

When the fluid is forced into the reservoir chamber 94 by motion of one of the pistons, hydraulic fluid will be expelled past the opposite check valve and from there to the chamber of the other cylinder assembly. Thus, the rear and front check valves 96 and 104 constitute replenishing valve mechanisms for the front and rear cylinder chambers 82 and 80 respectively.

Any motion of the fifth wheel 20 tending to depress the rearward piston 62 will be prevented by the hydraulic fluid contained in the chamber 80 which is sealed by the check valve 96 and the relief valve 100. However, if the force is sufficiently great, the fluid pressure will build up to a point so that valve 100 will recede and permit movement of the fifth wheel. Similarly, reverse motion of the fifth wheel will be resisted by the trapped hydraulic fluid within chamber 82 unless it is of sufficient magnitude to unseat the relief valve 108.

It is the purpose of this arrangement to utilize the high moment of inertia of the trailer in reducing pitch frequency of the tractor. The fifth wheel horizontal pivot 22 is locked by the fore and aft hydraulic cylinders 60 and 70 so that the tractor 10 and trailer 12 moves as a unit. The hydraulic cylinders 60 and 70 are connected through the unloading valve assembly 86 so that only when the load exceeds a predetermined amount will the system open and permit the fifth wheel 20 to pivot freely. Thus the tractor 10 and trailer 12 will be locked together for low load, low amplitude disturbances but will be unlocked for high load, high amplitude disturbances that might cause excessive forces on the tractor 10 or trailer 12 structure.

The unloading valve assembly 86 is provided with a connection to the lock mechanism 40 for the kingpin latch lever 34. When the kingpin latch 34 lock mechanism 40 is disengaged, the hydraulic system is unloaded and the fifth wheel 20 can pivot freely for coupling of the tractor 10 with the trailer 12. This is accomplished by means of shaft portions 110 and 112 that extend from the rearward relief valve 100 and forward relief valve 108, respectively. These extensions are connected by means of a lost motion construction with a common member 114. The connecting link 114 in turn is joined by means of a cable 116 to the handle 50 of the lock assembly 40. When the handle 50 controlling the plunger 44 is pulled outwardly to disengage the kingpin latch member 34, both the rearward and forward relief valves 100 and 108 are unseated to permit the free flow of hydraulic fluid between the chambers 80 and 82 through the valve assembly 86. With this structure the hydraulic control of fifth wheel motion occurs only when the lock 40 for the kingpin latch 34 is closed.

The foregoing described construction presents the presently preferred embodiment of this invention. Alterations and modifications may occur to those skilled in the art which will come within the scope and spirit of the following claims.

I claim:
1. A truck, a trailer, and means for connecting said truck and trailer, said means including a fifth wheel pivotally mounted upon said truck, a kingpin carried by said trailer, latching means adapted to secure said kingpin to said fifth wheel, hydraulic stabilizing means interposed between said fifth wheel and said truck, said hydraulic means including a pair of hydraulic piston and cylinder assemblies situated fore and aft the pivot of said fifth wheel, the cylinders of assemblies being interconnected to a common valve device, said valve device having spring pressed valve means restricting fluid flow between said cylinders below a predetermined pressure limit, said valve means being connected to said latching means and adapted to permit free fluid flow when said latching means is in an unlocked position.

2. Means for connecting a truck and a trailer including a fifth wheel pivotally mounted upon said truck, latching means for locking said trailer to said fifth wheel, a pair of hydraulic devices interposed between said fifth wheel and said truck, means interconnecting said devices and adapted to permit restricted fluid flow therebetween, said devices and said interconnecting means being adapted to restrict pivotal movement of said fifth wheel, disabling means connected to said latching means and to said interconnecting means and adapted to permit unrestricted pivotal movement of said fifth wheel by permitting unrestricted fluid flow between said devices when said latching means is in an unlocked position.

3. Means for connecting a truck and a trailer, said means including a fifth wheel mounted upon said truck, latching means for securing said trailer to said fifth wheel, said fifth wheel being tiltable about an axis transverse to the longitudinal axis of said truck, stabilizing means interposed between said fifth wheel and said truck, said stabilizing means being adapted to restrict tilting movement of said fifth wheel, said stabilizing means including means connected to said latching means and adapted to disable said stabilizing means and to permit free movement of said fifth wheel when said latching means is in an unlocked position.

4. A truck, a trailer, and means for connecting said truck and trailer, said means including a fifth wheel pivotally mounted upon said truck, latching means adapted to lock said trailer to said fifth wheel, hydraulic stabilizing means interposed between said fifth wheel and said truck, said hydraulic means including a pair of hydraulic cylinder assemblies situated fore and aft the pivot of said fifth wheel, said assemblies being interconnected to a common valve device having means restricting fluid flow between said assemblies below a predetermined pressure limit, said valve means being connected to said latching means and adapted to permit unrestricted fluid flow when said latching means is in an unlocked position.

References Cited in the file of this patent
UNITED STATES PATENTS

| | | |
|---|---|---|
| 2,093,486 | Schoepf | Sept. 21, 1937 |
| 2,391,372 | Weigand | Dec. 18, 1945 |
| 2,612,381 | Johnson | Sept. 30, 1952 |
| 2,667,364 | Colpo | Jan. 26, 1954 |
| 2,812,954 | Lyon | Nov. 12, 1957 |
| 2,847,230 | Hendrickson | Aug. 12, 1958 |
| 2,976,964 | Thompson | Mar. 28, 1961 |
| 3,002,767 | Gresko | Oct. 3, 1961 |